United States Patent
Dwyer et al.

(10) Patent No.: US 10,859,593 B2
(45) Date of Patent: Dec. 8, 2020

(54) REDUCING THERMAL EXPANSION INDUCED ERRORS IN A MAGNETIC CIRCUIT ASSEMBLY

(71) Applicant: Honeywell International Inc., Morris Plains, NJ (US)

(72) Inventors: Paul W. Dwyer, Seattle, WA (US); John Strehlow, Mukilteo, WA (US)

(73) Assignee: Honeywell International Inc., Charlotte, NC (US)

( * ) Notice: Subject to any disclaimer, the term of this patent is extended or adjusted under 35 U.S.C. 154(b) by 255 days.

(21) Appl. No.: 16/119,573

(22) Filed: Aug. 31, 2018

(65) Prior Publication Data

US 2020/0072862 A1   Mar. 5, 2020

(51) Int. Cl.
| | |
|---|---|
| *G01P 1/00* | (2006.01) |
| *G01P 15/125* | (2006.01) |
| *G01P 1/02* | (2006.01) |
| *G01P 15/08* | (2006.01) |

(52) U.S. Cl.
CPC .............. *G01P 1/006* (2013.01); *G01P 1/023* (2013.01); *G01P 15/125* (2013.01); *G01P 2015/0828* (2013.01)

(58) Field of Classification Search
CPC ....... G01P 1/006; G01P 15/132; G01P 15/125
USPC .............................................. 73/497, 514.23
See application file for complete search history.

(56) References Cited

U.S. PATENT DOCUMENTS

| | | | | |
|---|---|---|---|---|
| 4,182,187 A | * | 1/1980 | Hanson ................... | G01L 1/086 73/497 |
| 4,320,412 A | * | 3/1982 | Hynes ............... | H01L 23/49562 257/677 |
| 4,555,944 A | * | 12/1985 | Hanson .................. | G01P 15/132 73/514.32 |
| 4,592,234 A | * | 6/1986 | Norling ................. | G01P 15/132 73/497 |
| 4,658,647 A | * | 4/1987 | Shintani .................. | G01P 1/006 73/497 |
| 4,697,455 A | * | 10/1987 | Norling ................. | G01P 15/132 73/497 |
| 4,726,228 A | * | 2/1988 | Norling ................... | G01P 1/006 257/E21.422 |
| 4,854,169 A | * | 8/1989 | Sakuma .................. | G01P 1/006 73/497 |
| 5,220,831 A | | 6/1993 | Lee | |
| 5,524,488 A | * | 6/1996 | Foote ...................... | G01P 1/006 73/514.23 |
| 5,532,665 A | | 7/1996 | Foote et al. | |

(Continued)

FOREIGN PATENT DOCUMENTS

JP            08211095 A  *  8/1996

*Primary Examiner* — David L Singer
(74) *Attorney, Agent, or Firm* — Shumaker & Sieffert, P.A.

(57) ABSTRACT

A magnetic circuit assembly for an accelerometer includes an excitation ring that includes a base portion defining oppositely facing first and second sides, a ring portion extending from the second side of the base portion to define a ring recess, a first metallic inlay recessed into the first side of the base portion in which the first metallic inlay includes a material different than that of the base portion, a second metallic inlay recessed into the second side of the base portion in which the second metallic inlay includes a material different than that of the base portion, and a magnet received within the ring recess and attached to the second metallic inlay.

19 Claims, 5 Drawing Sheets

(56) References Cited

U.S. PATENT DOCUMENTS

| | | | |
|---|---|---|---|
| 5,557,044 A | 9/1996 | Foote et al. | |
| 5,587,530 A * | 12/1996 | Foote | G01P 1/006 |
| | | | 73/497 |
| 5,856,772 A * | 1/1999 | Foote | G01P 1/006 |
| | | | 335/222 |
| 5,952,575 A * | 9/1999 | Foote | G01P 15/132 |
| | | | 73/514.21 |
| 7,100,447 B2 | 9/2006 | Dwyer | |
| 7,164,199 B2 * | 1/2007 | Tarn | B81B 7/0048 |
| | | | 257/684 |
| 7,191,654 B2 | 3/2007 | Dwyer et al. | |
| 8,528,405 B2 | 9/2013 | Jenkins et al. | |
| 9,016,126 B2 | 4/2015 | Dwyer et al. | |
| 9,400,287 B2 | 7/2016 | Roehnelt et al. | |
| 9,658,244 B2 | 5/2017 | Dwyer et al. | |
| 10,036,765 B2 * | 7/2018 | Dwyer | G01P 15/132 |
| 10,161,956 B2 * | 12/2018 | Dwyer | G01P 15/132 |
| 2004/0119143 A1 * | 6/2004 | Karpnnan | G01P 1/023 |
| | | | 257/618 |
| 2005/0093134 A1 * | 5/2005 | Tarn | B81B 7/0048 |
| | | | 257/706 |
| 2006/0117853 A1 * | 6/2006 | Dwyer | G01P 15/132 |
| | | | 73/514.17 |
| 2008/0290494 A1 * | 11/2008 | Lutz | B81C 1/00476 |
| | | | 257/690 |
| 2009/0261691 A1 * | 10/2009 | Maeda | H01L 23/10 |
| | | | 310/348 |
| 2014/0374847 A1 * | 12/2014 | Hrovat | B81B 3/0016 |
| | | | 257/415 |
| 2016/0044841 A1 | 2/2016 | Chamberlain | |
| 2017/0010297 A1 * | 1/2017 | Dwyer | G01P 15/125 |
| 2017/0115321 A1 | 4/2017 | Dwyer et al. | |
| 2017/0129052 A1 | 5/2017 | Buller et al. | |
| 2017/0307653 A1 * | 10/2017 | Dwyer | G01P 15/132 |
| 2018/0141126 A1 | 5/2018 | Buller et al. | |

* cited by examiner

FIG. 4

REDUCING THERMAL EXPANSION INDUCED ERRORS IN A MAGNETIC CIRCUIT ASSEMBLY

TECHNICAL FIELD

The disclosure relates to magnetic circuit assemblies such as magnetic circuit assemblies for accelerometers.

BACKGROUND

Accelerometers function by detecting the displacement of a proof mass under inertial forces. An accelerometer assembly may, for example, detect the displacement of a proof mass by a capacitive pick-off system. In this example, a capacitor pick-off plate may be deposited on the upper surface of the proof mass, and a similar capacitor pick-off plate may be deposited on the lower surface of the proof mass. The capacitor plates cooperate with the inwardly facing surfaces of upper and lower stators to provide the capacitive pick-off system. Additionally, a force-rebalancing system may be used to detect the displacement of the proof mass, where coil forms with force-rebalancing coils are mounted on either side of the proof mass. The force-rebalancing coils cooperate with permanent magnets in the upper and lower stators and with a suitable feedback circuit to retain the proof mass at a predetermined position (i.e., a null position) with respect to the support structure. Acceleration applied to the accelerometer assembly may be determined based on the change in capacitance with respect to the capacitor pick-off plates or the current increase in the force-rebalancing coils to maintain the proof mass in the null position.

SUMMARY

In some examples, the disclosure describes techniques and devices that may reduce thermal expansion induced errors in a magnetic circuit assembly such as those used in a force rebalance accelerometer by, for example, reducing coefficient of thermal expansion (CTE) miss-matches between the excitation ring, magnetic, and proof mass assembly of the accelerometer. The devices described herein may also exhibit an improved magnetic return path within the magnetic circuit assembly.

In some examples, the disclosure describes an accelerometer that includes a magnetic circuit assembly for an accelerometer includes an excitation ring that includes a base portion defining oppositely facing first and second sides, a ring portion extending from the second side of the base portion to define a ring recess, a first metallic inlay recessed into the first side of the base portion in which the first metallic inlay includes a material different than that of the base portion, a second metallic inlay recessed into the second side of the base portion in which the second metallic inlay includes a material different than that of the base portion, and a magnet received within the ring recess and attached to the second metallic inlay.

In some examples, the disclosure describes an accelerometer that includes an upper and a lower magnetic circuit assembly in which at least one of the upper and the lower magnetic circuit assemblies includes an excitation ring that includes: a base portion defining oppositely facing first and second sides; a ring portion extending from the second side of the base portion to define a recess; a first metallic inlay recessed into the first side of the base portion in which the first metallic inlay includes a material different than that of the base portion; and a second metallic inlay recessed into the second side of the base portion in which the second metallic inlay comprising a material different than that of the base; and a magnet received within the recess and attached to the second metallic inlay. The accelerometer includes a proof mass assembly mounted between the upper and the lower magnetic circuit assemblies, the proof mass assembly includes a proof mass, a proof mass support structure, a pair of flexures flexibly connecting the proof mass to the support structure in which the flexure allows the proof mass to move about a plane defined by the support structure.

In some examples, the disclosure describes a method for forming a magnetic circuit assembly for an accelerometer that includes forming an excitation ring that includes a base portion defining oppositely facing first and second sides and a ring portion extending from the second side of the base portion to define a ring recess. The method includes forming a first metallic inlay recessed into the first side of the base portion in which the first metallic inlay includes a material different than that of the base portion, forming a second metallic inlay recessed into the second side of the base portion in which the second metallic inlay comprising a material different than that of the base portion, and attaching a magnet received within the recess to the second metallic inlay with a layer of an adhesive.

The details of one or more examples of the disclosure are set forth in the accompanying drawings and the description below. Other features, objects, and advantages of the disclosure will be apparent from the description and drawings, and from the claims.

DETAILED DESCRIPTION

In some examples, the present disclosure describes techniques and devices that may provide reduced thermal expansion induced errors in acceleration measurements associated with the magnetic circuit assemblies of accelerometers and/or improve magnetic return paths within the described magnetic circuit assemblies by improving the CTE compatibilities of components within the accelerometer. An accelerometer may operate by measuring changes to directional force exerted on the accelerometer with respect to an inertial reference frame. A force rebalance accelerometer may include a proof mass formed from amorphous quartz, suspended by one or more flexures to enable the proof mass to deflect in response to forces or accelerations along a sensing axis, generally perpendicular to the plane of the proof mass. At rest, the proof mass may be suspended equidistantly between upper and lower excitation rings. Electrically conductive material forming pick-off capacitance plates, may be disposed on opposing sides of the proof mass to form capacitive elements with the excitation rings. An acceleration or force applied along the sensing axis causes the proof mass to deflect either upwardly or downwardly. The deflection causes the distance between the pick-off capacitance plates and the upper and lower excitation rings to vary. This change in the distance between the pick-off capacitance plates and the upper and lower excitation rings causes a change in the capacitance of the capacitive elements. The difference in the capacitances of the capacitive elements is thus representative of the displacement of the proof mass along the sensing axis. This displacement signal may be applied to a servo system that includes one or more electromagnets which function to return the proof mass to its null or at-rest position. The magnitude of the drive currents applied to the electromagnets, in turn, is representative of the acceleration or force along the sensing axis.

Navigation systems and positioning systems rely on the accuracy of accelerometers to perform operations. The accuracy of some accelerometers may be limited by bias instabilities (e.g., a change in the physical structure of the accelerometer assembly) caused by physical or thermal strains. For example, bias instabilities may be created due to heating and cooling effects that occur during the construction process or general operation of the accelerometer. The heating and cooling effects may introduce stress on the accelerometer due to CTE mismatches between the materials used to construct components of the accelerometer. The CTE mismatches may alter the position of the proof mass, alter the capacitive gaps between the proof mass and the upper and lower magnetic circuit assemblies, alter the connection between the magnet and excitation ring within a magnetic circuit assembly, and/or cause other effects that create false or inaccurate acceleration readings. For example, the electromagnetic circuit assemblies may include a magnet formed from, for example, alnico that is bonded to an excitation ring formed from a material having relatively high permeability, such as Invar-36 or Super Invar, to form a magnetic return path. Alnico magnets and Invar-36 or Super Invar excitation rings may have CTE differences on the order of about $10 \times 10^{-6}$/Kelvin (10 parts per million per degree Celsius (ppm/° C.)). As such, the interface defined between the magnet and the excitation ring will be subject to stress as a function of temperature. Such stress over a period of time and/or temperature range may create temperature-induced false acceleration signals, compromising the precision and accuracy of motion-sourced acceleration as well as degrades the performance of the accelerometer.

In some examples, to compensate for the CTE mismatches between the excitation ring and the magnet, a compliant epoxy may be used at the interface to bond the magnet to the excitation ring. However, such compliant epoxies may degrade the long-term stability of the accelerometer as well as create an air-gap between the magnet and excitation ring which may degrade the magnetic return path between the two components.

Figure 1A:
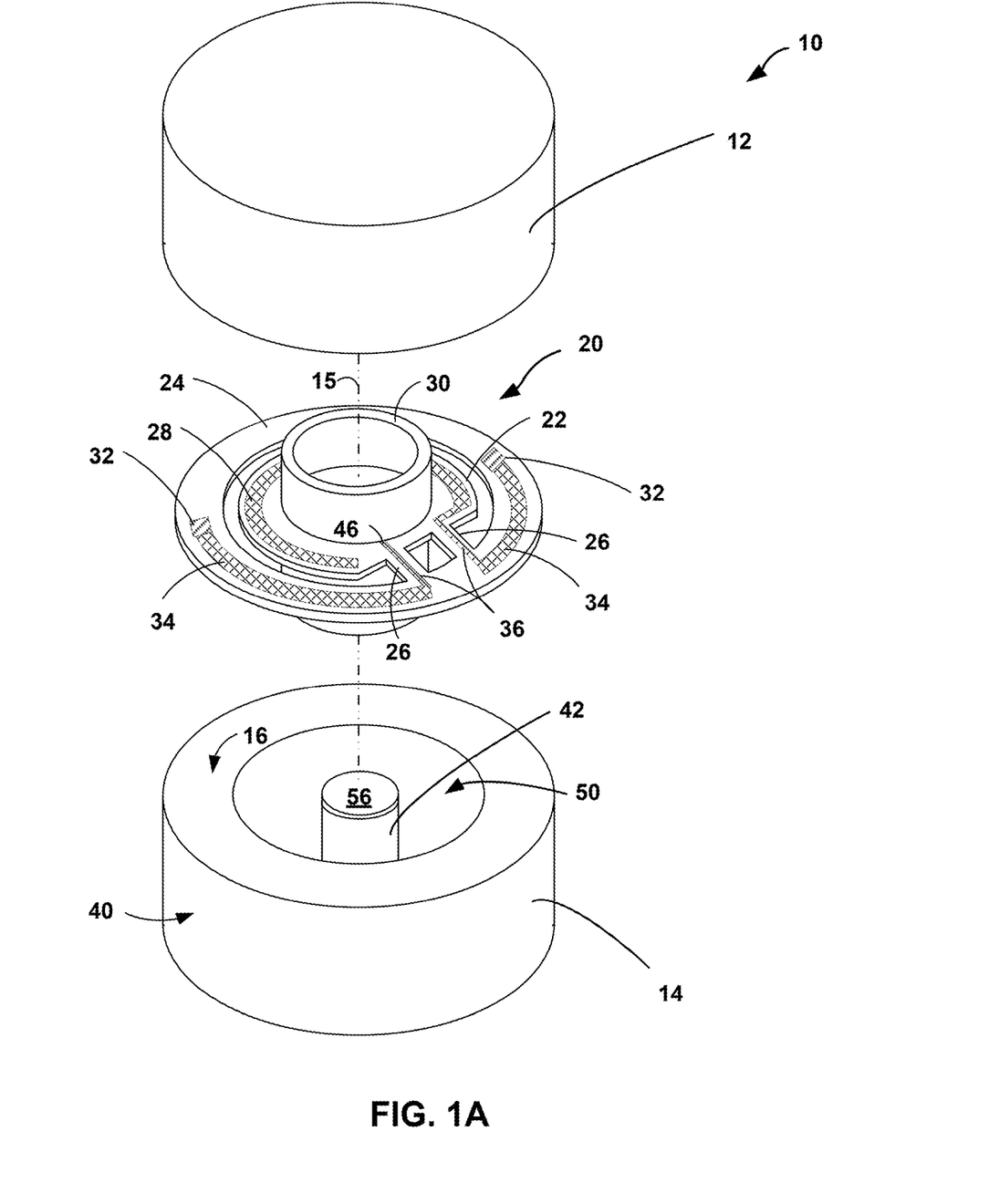
FIGS. 1A and 1B are schematic diagrams illustrating an exploded view (FIG. 1A) and a partial cross-sectional side view (FIG. 1B) of an example accelerometer that includes an upper magnetic circuit assembly, a lower magnetic circuit assembly, and a proof mass assembly disposed between the upper and lower magnetic circuit assemblies.
Figure 1B:
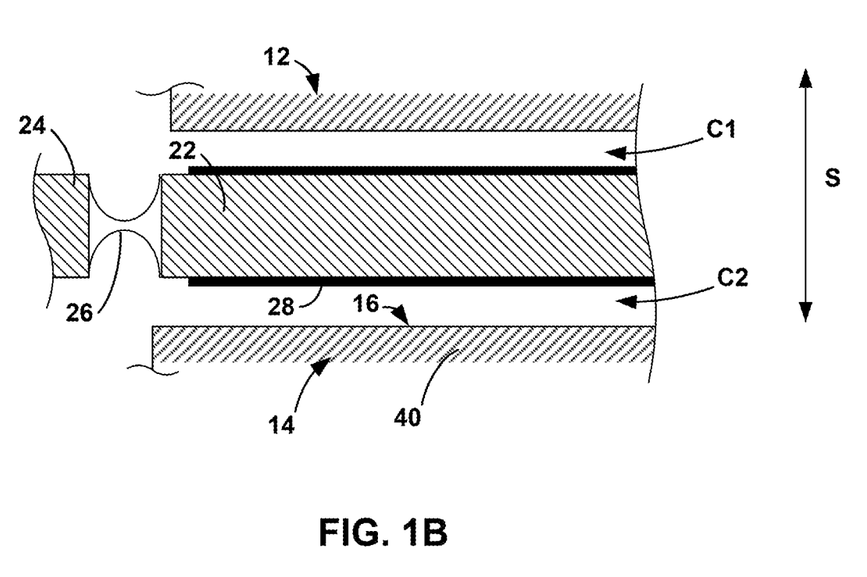

The techniques and devices disclosed herein are intended to reduce the thermally induced error effects observed within accelerometers as well as improve the magnetic return paths within the accelerometers. FIGS. 1A and 1B are schematic diagrams illustrating an exploded view (FIG. 1A) and a partial cross-sectional side view (FIG. 1B) of an example accelerometer 10 (e.g., a force rebalance accelerometer) including an upper magnetic circuit assembly 12, a lower magnetic circuit assembly 14, and a proof mass assembly 20 disposed between upper and lower magnetic circuit assemblies 12 and 14 and assembled along central axis 15. In some examples, upper and lower magnetic circuit assemblies 12 and 14 may include inwardly facing surfaces (e.g., inward facing surface 16 of lower magnetic circuit assembly 14) configured to interact with portions of proof mass assembly 20 (e.g., interact with mounting pads 32). In some examples, surface 16 may be planar with the size and structure of mounting pads 32 establishing the separation gap between surface 16 and pick-off capacitance plates 28 as describe further below. Upper and lower magnetic circuit assemblies 12 and 14 may each include an excitation ring and magnet as described further below with respect to FIG. 2.

Accelerometer 10 includes a proof mass assembly 20, which may be mounted between upper and lower magnetic circuit assemblies 12 and 14. In some examples, proof mass assembly 20 may include a proof mass 22, a proof mass support structure 24, and a pair of flexures 26 flexibly connecting proof mass 22 to proof mass support structure 24. Proof mass support structure 24 of proof mass assembly 20 may provide structural support for proof mass 22 and help maintain the separation between proof mass 22 and upper and lower magnetic circuit assemblies 12 and 14. In some examples, proof mass support structure 24 may define a plane in which proof mass 22 and flexures 26 are located. As shown, proof mass support structure 24 may be in a form of a planar ring structure that substantially surrounds proof mass 22 and substantially maintains flexures 26 and proof mass 22 in a common plane. Although proof mass support structure 24 as shown in FIG. 1A is a circular shape, it is contemplated that proof mass support structure 24 may be any shape (e.g., square, rectangular, oval, or the like) and may or may not surround proof mass 22.

Proof mass 22 may include an upper and lower pick-off capacitance plates (only upper pick-off capacitance plate 28 is shown in FIG. 1) and upper and lower force-rebalance coils (upper force-rebalance coil 30 is labeled in FIG. 1) mounted on the major surfaces of proof mass 22 and configured to interact with upper and lower magnetic circuit assemblies 12 and 14. Proof mass support structure 24, may include one or more mounting pads 32 and one or more electrical traces 34. Flexures 26 may contain one or more thin film leads 36 on an upper or lower surface of the respective flexure of flexures 26 configured to transmit an electrical signal across the respective flexure.

Proof mass 22 and proof mass support structure 24 may be formed using any suitable material. In some examples, proof mass 22 and proof mass support structure 24 may be made of fused quartz ($SiO_2$). Fused quartz has a relatively low CTE of about 0.55 ppm/° C.

In some examples, upper and lower magnetic circuit assemblies 12 and 14 may be mounted to opposite sides of proof mass assembly 20 using one or more of the respective mounting pads (e.g., mounting pads 32). In some examples, upper and lower magnetic circuit assemblies 12 and 14 may be secured to proof mass assembly 20 using a bellyband (not shown). In such examples, the bellyband may be formed from a single metal hoop-like structure that surrounds the exterior of upper and lower magnetic circuit assemblies 12 and 14. The belly band may be fixed to upper and lower magnetic circuit assemblies 12 and 14 using, for example, an epoxy, thereby securing upper and lower magnetic circuit assemblies 12 and 14 after they are clamped to proof mass assembly 20.

Figure 2:
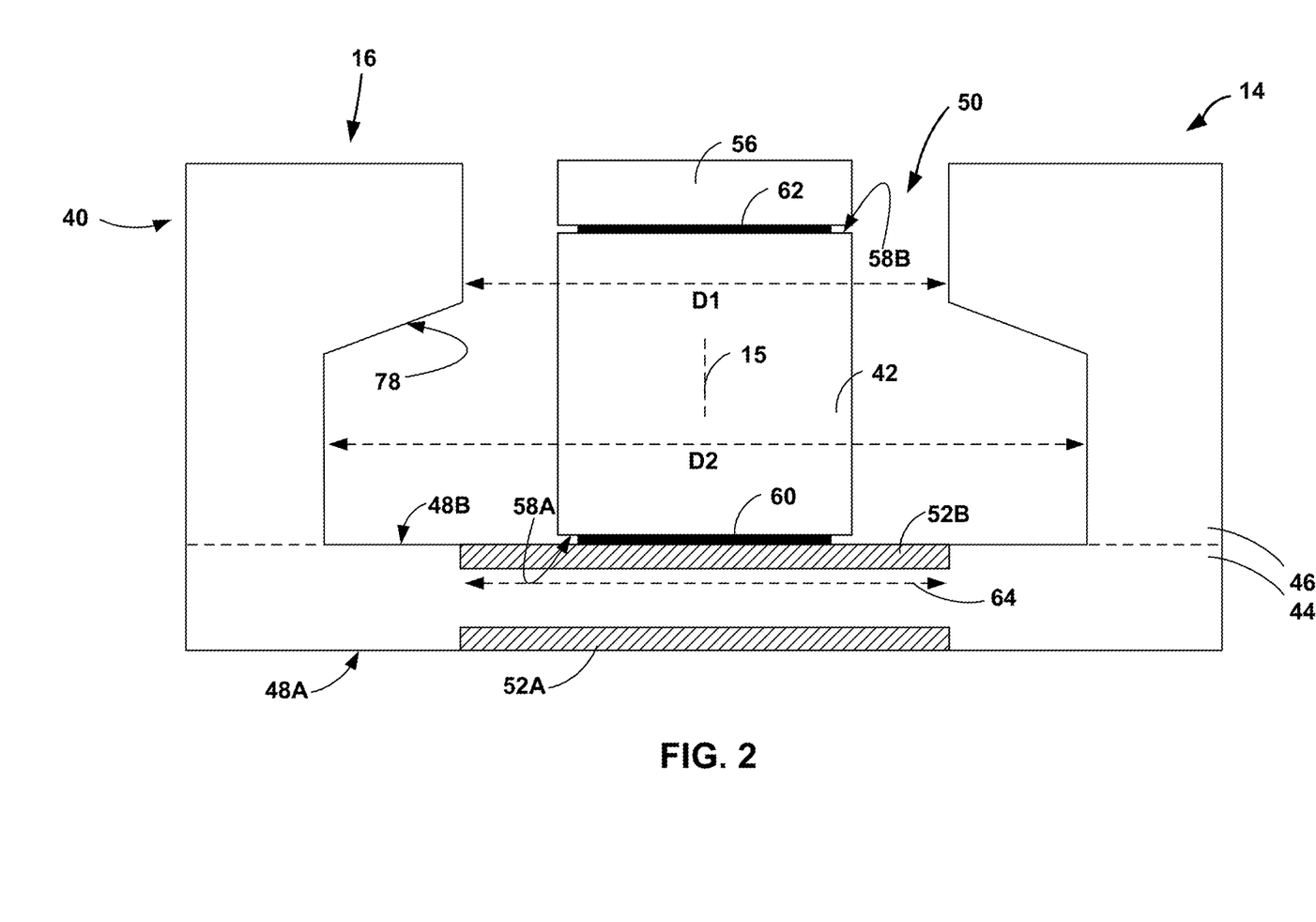
FIG. 2 is a conceptual diagram illustrating a top-view of an example proof mass assembly.

FIG. 2 is schematic cross-sectional view of an example magnetic circuit assembly (e.g., lower magnetic circuit assembly 14 of accelerometer 10 shown in FIGS. 1A and 1B) providing better illustration of some of the structural components described herein. Upper and lower magnetic circuit assemblies 12 and 14 may each include an excitation ring 40 and a permanent magnet 42 mounted to the excitation ring 40. Excitation ring 40 may be described in terms of a base portion 44 and a ring portion 46. Base portion 44 may define oppositely facing first and second sides 48A and 48B respectively with ring portion 46 extending from second side 48B such that base portion 44 and ring portion 46 define a recess 50. In some examples, excitation ring 40 may be configured to define generally U-shaped or sideways C-shaped cross section (FIG. 2).

Base portion 44 may include a first metallic inlay 52A recessed into first side 48A and a second metallic inlay 52B recessed into second side 48B. As described further below, first and second metallic inlays 52A and 52B may be formed of a different material than base portion 44 and selected to have a high relative magnetic permeability (e.g., greater than about 1,500$\mu_r$) and a CTE that is more compatible with magnet 42 (e.g., a CTE that is closer in absolute value to the CTE of magnet 42 compared to the difference in CTE values of base portion 44 and magnet 42). Relative permeability, denoted by the symbol $\mu_r$ is the ratio of the permeability of a specific medium to the permeability of free space to (e.g., $\mu_0 = \pi \times 10^{-7}$ N·A$^{-2}$)

Upper and lower magnetic circuit assemblies 12 and 14 also include permanent magnet 42 mounted to respective second metallic inlays 52B of upper and lower magnetic circuit assemblies 12 and 14, and a pole piece 56 mounted to permanent magnet 42. In some examples, magnet 42 may define opposing bonding surfaces 58A and 58B that are respectively centrally secured to second metallic inlay 52B of a respective excitation ring 40 via an adhesive 60 and a respective pole piece 56 via an adhesive 62.

The material for excitation ring 40 (e.g., base and ring portions 44 and 46) may be selected to have relatively high permeability, such as Invar-36 or Super Invar, to form a magnetic return path, and a relatively low CTE (e.g., between about 0.3 ppm/° C. and about 2 ppm/° C.) to ensure compatibility with the material of proof mass support structure 24 (e.g., quartz, having a CTE of about 0.55 ppm/° C.) and ensure proper operation of accelerometer 10. In some examples, excitation ring 40 (e.g., base and ring portions 44 and 46) may be composed of Super Invar (e.g., Super Invar 32-5 comprising about 32% nickel; about 5.4% cobalt; <1% of each of copper, carbon, silicon, manganese, sulfur, chromium, and aluminum; a balance of iron) which may define a CTE in the range of about 0.3-1 ppm/° C.) to ensure compatibility with proof mass assembly 20.

During operation of accelerometer 10, inwardly facing surfaces 16 on the excitation rings 40 may form in combination with the conductive material of pick-off capacitance plates 28 on the opposing sides of the proof mass 22, variable capacitance elements C1 and C2 as shown in FIG. 1B. In rest or null position, the distances between the surfaces 16 of the upper and lower excitations rings 40 and the pick-off capacitance plates 28 and the capacitance values of the capacitance elements may be equal in this position.

In response to an acceleration or force along sensing axis S (e.g., central axis 15), generally perpendicular to the plane of the proof mass 22, the proof mass 22 moves toward one or the other of the excitation rings 40 of upper and lower magnetic circuit assemblies 12 and 14. This displacement of the proof mass 22 changes the respective distances between surfaces 16 and pick-off capacitance plates 28 formed on the opposing sides of the proof mass 22. In some examples, this change in the distance results in a change in the capacitance of the capacitive elements C1 and C2. The difference in the values of the capacitances C1 and C2 may be representative of the displacement of the proof mass 22 either upwardly or downwardly along the sensing axis S. This displacement signal may be applied to a servo system which includes upper and lower magnetic circuit assemblies 12 and 14 and force rebalance coils 30 which form electromagnets to return the proof mass 22 to its null position. The magnitude of the drive current to the electromagnets may be used to measure the acceleration of the proof mass 22 along the sensing axis S.

In some examples, magnet 42 may be secured directly to base portion 44 of excitation ring 40 using adhesive 60. However, in such examples the CTE mismatch between magnet 42 (e.g., alnico magnet having a CTE of about 10 to about 12 ppm/° C.) and the material used to form excitation ring 40 (e.g., Invar-36 or Super Invar) may be relatively large, such as on the order of about 10 ppm/° C. Furthermore, selecting a material for excitation ring 40 that defines a higher CTE (e.g., a CTE closer to that of magnet 42) that is closer to magnet 42, may increase the CTE mismatch between excitation ring 40 and proof mass support structure 24.

In order to compensate for the CTE differences between base portion 44 and magnet 42, a thermally compliant adhesive 60 may be used to bond magnet 42 to base portion 44. To insure appropriate compliance between base portion 44 and magnet 42, adhesive 60 may need to be deposited as a relatively thick layer (e.g., about 2 millimeters (mm) to about 3 mm) to accommodate the differences in linear expansions during thermal cycling. Having a relatively thick layer of adhesive 60 between base portion 44 and magnet 42 will effectively act as an air gap between base portion 44 to magnet 42, thereby increasing the magnetic reluctance of the magnetic return path from base portion 44 to magnet 42. However, reducing the thickness of adhesive 60 may exasperate the thermally induced strain on magnet 42 which may alter the magnetic properties of magnet 42 and reduce the accuracy of accelerometer 10.

By including second metallic inlay 52B between base portion 44 and magnet 42, and selecting the composition of second metallic inlay 52B such that the CTE of second metallic inlay 52B is greater than that of base portion 44 and closer in relative comparison to magnet 42, the material of second metallic inlay 52B and magnet 42 may have a greater CTE compatibility and thus permit a layer of adhesive 60 with a lower thickness (e.g., about 0.2 mm to about 0.5 mm) between second metallic inlay 52B and magnet 42 to accommodate the differences in linear expansions during thermal cycling. The reduced thickness of adhesive 60 likewise reduces the effective air-gap between magnet 42 and excitation ring 60 to improve the magnetic properties of magnetic circuit assemblies 12 and 14. Additionally, by selecting the composition of second metallic inlay 52B to exhibit a relatively high magnetic permeability (e.g., a relative magnetic permeability of greater than 1,500$\mu_r$), the magnetic return path from excitation ring 40 to magnet 42 may be improved. Magnetic permeability may be determined according to ASTM-A-596. In some examples, second metallic inlay 52B may define a high magnetic permeability that is either equal to or greater than that of excitation ring 40 (e.g., greater than Invar-36 or Super Invar).

Any suitable material may be selective for first and second metallic inlays 52A and 52B provided that the material has a relatively high magnetic permeability (e.g., equal to or greater than that of excitation ring 40) and defines a CTE that is more compatible with magnet 42 than that of excitation ring 40 (e.g., possess a CTE greater than that of excitation ring 40 and between that of excitation ring 44 and magnet 42, or possess a CTE greater than that of excitation ring 40 and closer in value to magnet 42 than that of excitation ring 44). In some examples, the difference between the CTE of excitation ring 40 and the CTE of magnet 42 may be less than about 35% relative to the CTE of magnet 42 (e.g., the CTE difference divided by the CTE of magnet 42). Example suitable materials for first and second metallic inlays 52A and 52B include, but are not limited to, HYMU 80® (e.g., about 80%, 1-4% molybdenum, <1% silicon, manganese, and carbon, and a balance iron) available from Carpenter Technology Corporation, PA, US, which may exhibit a relative permeability of about 80,000$\mu_r$ and a CTE of about 10 ppm/° C. at 0° C.; High Permeability Alloy 49 (e.g., about 51% iron, 48% nickel, and <1% manganese, silicon, and carbon) which may exhibit a relative permeability of about 75,000$\mu_r$ and a CTE of about 8 ppm/° C. at 0° C.; Mu-metal (e.g., nickel-iron soft ferromagnetic alloy such as 77% nickel, 16% iron, 5% copper, and 2% chromium or molybdenum) which may exhibit a relative permeability of about 80,000$\mu_r$ to about 100,000$\mu_r$ and a CTE of about 10 ppm/° C. at 0° C.; or the like.

First and second metallic inlays 52A and 52B may each be recessed into base portion 44 on oppositely facing first and second surfaces 48A and 48B. By recessing both first and second metallic inlays 52A and 52B into base portion 44, thermal expansion discrepancies between metallic inlays 52A and 52B and base portion 44 may be counterbalanced. For example, if only second metallic inlay 52B were present and recessed in to base portion 44, increasing the operational temperature of accelerometer 10 would cause second metallic inlay 52B to expand at a greater rate than base portion 44 due to its higher CTE. The expansion of second metallic inlay 52B would stress base portion 44 and exert force on base portion 44 in the direction of arrow 64, ultimately causing base portion to distort or bow slightly causing the ring opening diameter (D1) to expand. By recessing both first and second metallic inlays 52A and 52B into base portion 44, the expansion of both first and second metallic inlays 52A and 52B may create counteracting distortion forces that attempt to bow base portion 44 in counterbalancing convex and concave directions, which allows the ring opening diameter (D1) to remain relatively constant.

First and second metallic inlays 52A and 52B may be inlayed into base portion 44 using any suitable technique. For example, base portion 44 may be mechanically machined with recesses on first and second sides 48A and 48B that are sized to receive first and second metallic inlays 52A and 52B. First and second metallic inlays 52A and 52B may be formed separately and then deposited in the defined recesses and secured using a suitable braze, solder, adhesive, weld, or the like. In other examples, first and second metallic inlays 52A and 52B may be deposited into the defined recesses using an additive manufacturing process (e.g., binder jet three-dimensional printing).

In some examples, first and second metallic inlays 52A and 52B and base portion 44 may be integrally formed through an additive manufacturing process. For example, base portion 44, first metallic inlay 52A, second metallic inlay 52B, and optionally ring portion 46 may be formed on a layer by layer basis using an additive manufacturing technique. Examples additive manufacturing techniques that may be used to form base portion 44, first metallic inlay 52A, and second metallic inlay 52B may include, for example binder jet three-dimensional printing in which a binder is selectively deposited onto the powder bed of metallic material (e.g., powdered particulates of Super Invar, HYMU 80, or the like) to bond these areas of powder together to form a solid material one layer at a time. The components can be built up on a layer-by-layer basis using selected materials (e.g., powders) for each respective layer of the components into the desired shape.

Figure 3:
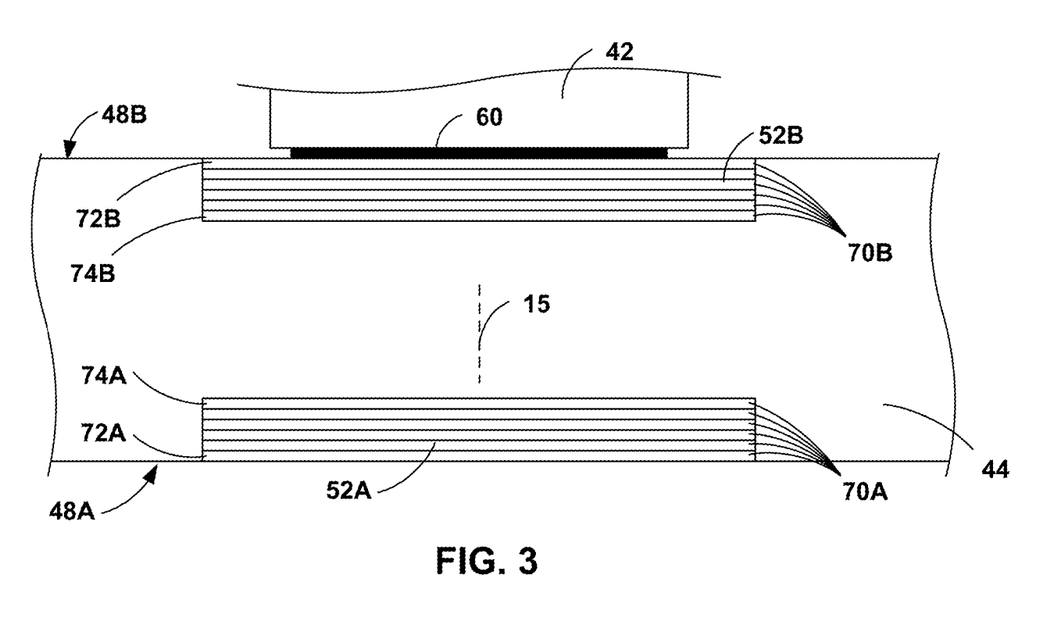
FIG. 3 is a conceptual cross-sectional view of a portion of an example proof mass assembly including a flexure connecting a support structure to a proof mass.

In some examples, first metallic inlay 52A and second metallic inlay 52B may each be constructed as a multi-layer component. FIG. 3 is a schematic cross-sectional view showing a close up of base portion 44. As shown in FIG. 3, first metallic inlay 52A and second metallic inlay 52B may be constructed with a plurality of metallic layers 70A and 70B respectively.

In some examples, the layer construction of first metallic inlay 52A and second metallic inlay 52B may be substantially the same (e.g., the same or nearly the same) with the difference being the orientation of layers 70A and 70B within respective metallic inlay 52A and 52B being opposite of one another. For example, the respective outermost layers 72A and 72B may be formed of the same material and the respective innermost layers 74A and 74B may be formed of the same material.

In some examples, plurality of metallic layers 70A and 70B may include layers of different metals or metal alloys. For example, plurality of metallic layers 70A and 70B may be constructed with high permeability materials that define a transitioning CTE gradient that increases from innermost layers 74A and 74B to outermost layers 72A and 72B respectively. In such examples, outermost layers 72A and 72B may be configured with a CTE being more compatible with magnet 42 (e.g., CTE values being closer in relative value than the CTEs of base portion 44 and magnet 42) and innermost layers 74A and 74B may be configured with a CTE being more compatible with base portion 44 (e.g., CTE values being closer in relative value than the CTEs of base portion 44 and magnet 42). In some examples, plurality of metallic layers 70A and 70B may include one or more layers of HYMU 80® and High Permeability Alloy 49.

Figure 4:
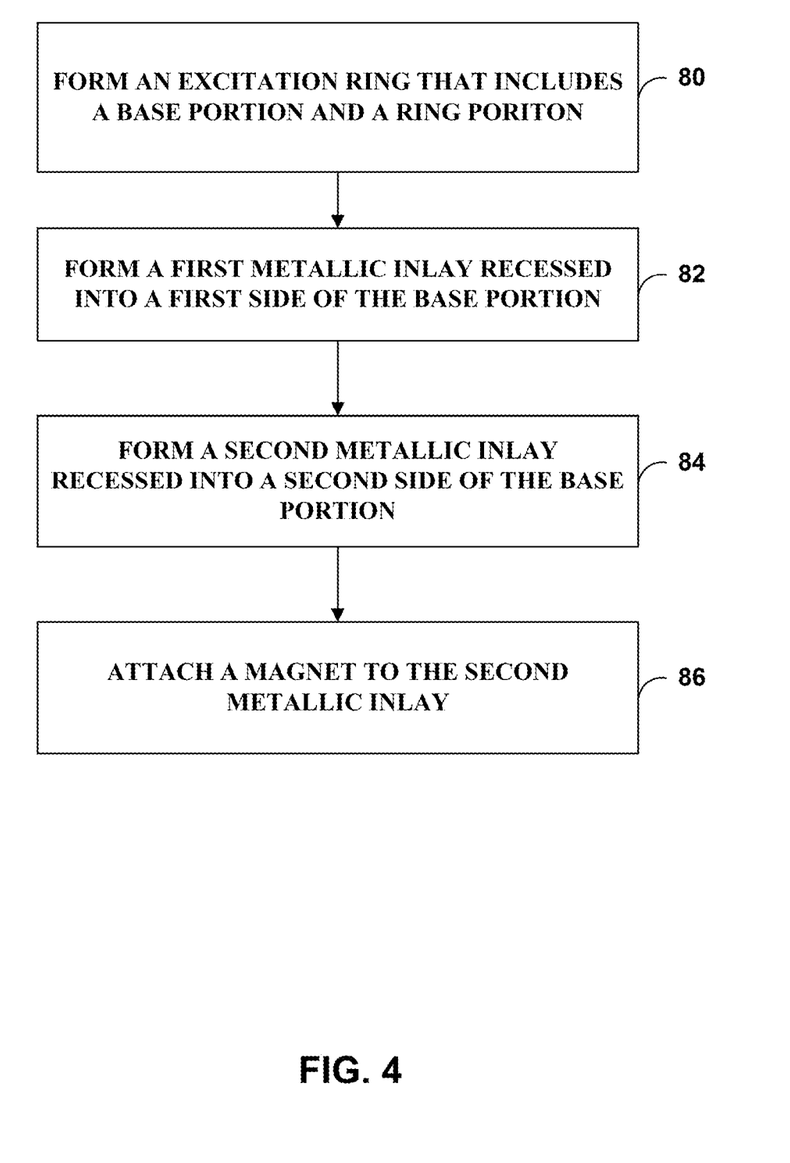
FIG. 4 is a flow chart illustrating an example technique for making an example accelerometer in accordance with the disclosure.

Accelerometer 10 may be formed using any suitable technique. FIG. 4 is a flow diagram illustrating an example technique for forming an example accelerometer in accordance with the disclosure, such as, for example accelerometer 10. While the technique shown in FIG. 4 is described with respect to accelerometer 10, in other examples, the techniques may be used to form other accelerometers or portions of accelerometers that include different configurations, or the accelerometers or portions of accelerometers described herein may be form using other techniques.

The technique illustrated in FIG. 4 includes forming upper and lower magnetic circuit assemblies 12 and 14 for accelerometer 10 that includes forming excitation ring 40 that includes base portion 44 and ring portion 46 (80); forming first metallic inlay 52A recessed into first side 48A of base portion 44 (82); forming second metallic inlay 52B recessed into second side 48B of the base portion 44 (84); and attaching a magnet to second metallic inlay 52B (86).

Base portion 44 and ring portion 46 of excitation ring 40 may be formed using any suitable technique. For example, both base and ring portions 44 and 46 may be formed from a single piece of a low CTE, high magnetic permeability material (e.g., Super Invar) with recess 50, surfaces 48A and 48B, the accompanying recesses for metallic inlays 52A and 52B formed in surfaces 48A and 48B, as well as any other structural features being machined into the material. Additionally, or alternatively, excitation ring 40 may be formed using and additive manufacturing technique (e.g., binder jet three-dimensional printing) where particles of the selected material (e.g., Super Invar) are deposited on a layer-by-layer basis and bonded together using a selectively deposited binder. In some such examples, the recesses for metallic inlays 52A and 52B may be formed during and/or after the layer formation of excitation ring 40. In other examples, metallic inlays 52A and 52B may be formed in conjunction with the formation of base portion 44.

In some examples where base and ring portions 44 and 46 are formed as part of an additive manufacturing process, ring portion 46 may be defined with a ring recess 50 that includes a tapered neck section 78 where the inner diameter of ring recess 50 transitions gradually from a larger ring diameter (D2) to a smaller ring diameter (D1) then moving in a direction away from first surface 48B along central axis 15. In some examples, tapered neck section 78 may define a surface sloped at about 45° relative to central axis 15. The inclusion of tapered neck section 78 may be possible as a result of forming ring portion 46 via additive manufacturing and may allow for construction of the excitation ring using this methodology.

The technique illustrated in FIG. 4 also includes forming first metallic inlay 52A recessed into first side 48A of base portion 44 (82) and forming second metallic inlay 52B recessed into second side 48B of the base portion 44 (84). In some examples, first and second metallic inlays 52A and 52B may be formed separate from excitation ring 40 and subsequently deposited into the respective recesses of first and second sides 48A and 48B and secured via braising, soldering, welding, adhesive, or other suitable technique.

In some examples, first and second metallic inlays 52A and 52B may be formed using an additive manufacturing technique (e.g., binder jet three-dimensional printing) where particles of one or more high permeability materials (e.g., HYMU 80, High Permeability Alloy 49, or the like) are deposited on a layer-by-layer basis and bound together using a selectively deposited binder. The layers may be formed separate of base portion 44, formed within the respective recesses of first and second sides 48A and 48B, or formed simultaneously with the formation of base portion 44.

In some examples, first metallic inlay 52A and second metallic inlay 52B may each be formed with plurality of metallic layers 70A and 70B respectively that include metallic layers of materials of differing CTEs and or magnetic permeabilities. In some examples, plurality of metallic layers 70A and 70B may be formed with high permeability materials that define a transitioning CTE gradient that increases from innermost layers 74A and 74B to outermost layers 72A and 72B respectively. As described above, each layer may be formed using an additive manufacturing technique (e.g., binder jet three-dimensional printing) to form layers 70A and 70B of different materials.

After the formation of second metallic inlay 52B, magnet 42 may be attached to second metallic inlay 52B (e.g., attached outermost layer 72B) using compatible adhesive 60. As described above, the inclusion of second metallic inlay 52B may act as an intermediate material that improve the CTE compatibility between base portion 44 and magnet 42 and allowing the thickness of the layer of adhesive 60 to be reduced. In some examples the thickness of adhesive 60 as measured relative to central axis 15 may be less than about 0.2 mm.

Various examples of the disclosure have been described. These and other examples are within the scope of the following claims.

What is claimed is:

1. A magnetic circuit assembly for an accelerometer comprising:
   an excitation ring comprising:
   a base portion defining oppositely facing first and second sides;
   a ring portion extending from the second side of the base portion to define a ring recess;
   a first metallic inlay recessed into the first side of the base portion, the first metallic inlay comprising a material different than that of the base portion;
   a second metallic inlay recessed into the second side of the base portion, the second metallic inlay comprising a material different than that of the base portion; and
   a magnet received within the ring recess and attached to the second metallic inlay,
   wherein the second metallic inlay comprises a plurality of metallic layers, wherein respective metallic layers of the plurality of metallic layers define different coefficients of thermal expansion.

2. The magnetic circuit assembly of claim 1, wherein the second metallic inlay defines a coefficient of thermal expansion (CTE) that is greater than a CTE of the base portion.

3. The magnetic circuit assembly of claim 2, wherein the magnet defines a CTE that is closer in relative value to the CTE of an outermost metallic layer of the plurality of metallic layers of the second metallic inlay than the CTE of the base portion.

4. The magnetic circuit assembly of claim 1, wherein the second metallic inlay defines a relative magnetic permeability of greater than about $1,500\mu_r$.

5. The magnetic circuit assembly of claim 1, wherein the second metallic inlay defines a magnetic permeability that is greater than a magnetic permeability of the base portion.

6. The magnetic circuit assembly of claim 1, wherein the first metallic inlay and the second metallic inlay comprise substantially the same material composition.

7. The magnetic circuit assembly of claim 1, wherein the second metallic inlay comprises at least one of HYMU 80 or High Permeability Alloy 49 and the base portion comprises at least one of Invar-36 or Super Invar.

8. The magnetic circuit assembly of claim 1, wherein the different coefficients of thermal expansion defined by the respective metallic layers of the second metallic inlay define a CTE gradient, wherein an outermost layer of the plurality of metallic layers defines a highest CTE and an innermost layer of the plurality of metallic layers defines a lowest CTE.

9. An accelerometer comprising:
   an upper and a lower magnetic circuit assembly, at least one of the upper and the lower magnetic circuit assemblies comprising:
   an excitation ring comprising:
   a base portion defining oppositely facing first and second sides;
   a ring portion extending from the second side of the base portion to define a recess;
   a first metallic inlay recessed into the first side of the base portion, the first metallic inlay comprising a material different than that of the base portion;
   a second metallic inlay recessed into the second side of the base portion, the second metallic inlay comprising a material different than that of the base portion, wherein the second metallic inlay comprises a plurality of metallic layers, wherein respective metallic layers of the plurality of metallic layers define different coefficients of thermal expansion; and
   a magnet received within the recess and attached to the second metallic inlay; and a proof mass assembly mounted between the upper and the lower magnetic circuit assemblies, the proof mass assembly comprising:

a proof mass;

a proof mass support structure;

a pair of flexures flexibly connecting the proof mass to the support structure, wherein the flexure allows the proof mass to move about a plane defined by the support structure.

10. The accelerometer of claim 9, wherein the second metallic inlay defines a coefficient of thermal expansion (CTE) that is greater than a CTE of the base portion, and wherein the magnet defines a CTE that is closer in relative value to the CTE of an outermost metallic layer of the plurality of metallic layers of the second metallic inlay than the CTE of the base portion.

11. The accelerometer of claim 9, wherein the second metallic inlay defines a relative magnetic permeability of greater than about $1,500\mu_r$.

12. The accelerometer of claim 9, wherein the first metallic inlay and the second metallic inlay comprise substantially the same material composition.

13. The accelerometer of claim 9, wherein the second metallic inlay comprises at least one of HYMU 80 or High Permeability Alloy 49, the base portion comprises at least one of Invar-36 or Super Invar, and the proof mass support structure comprises fused silica.

14. The accelerometer of claim 9, wherein the different coefficients of thermal expansion defined by the respective metallic layers of the second metallic inlay defines a CTE gradient, and wherein an outermost layer of the plurality of metallic layers defines a highest CTE and an innermost layer of the plurality of metallic layers defines a lowest CTE.

15. A method of forming a magnetic circuit assembly for an accelerometer, the method comprising:

forming an excitation ring comprising:

a base portion defining oppositely facing first and second sides; and a ring portion extending from the second side of the base portion to define a ring recess;

forming a first metallic inlay recessed into the first side of the base portion, the first metallic inlay comprising a material different than that of the base portion;

forming a second metallic inlay recessed into the second side of the base portion, the second metallic inlay comprising a material different than that of the base portion, wherein the second metallic inlay comprises a plurality of metallic layers, wherein respective metallic layers of the plurality of metallic layers define different coefficients of thermal expansion; and attaching a magnet received within the recess to the second metallic inlay with a layer of an adhesive.

16. The method of claim 15, wherein forming the second metallic inlay comprises forming the plurality of metallic layers of the second metallic inlay using an additive manufacturing technique, wherein the second metallic inlay defines a coefficient of thermal expansion (CTE) that is greater than a CTE of the base portion, and wherein the magnet defines a CTE that is closer in relative value to the CTE of an outermost metallic layer of the plurality of metallic layers of the second metallic inlay than the CTE of the base portion.

17. The method of claim 16, wherein the different coefficients of thermal expansion defined by the respective metallic layers of the second metallic inlay define a CTE gradient, wherein an outermost layer of the plurality of metallic layers defines a highest CTE and an innermost layer of the plurality of metallic layers defines a lowest CTE, and wherein the innermost layer is deposited directly on the base portion.

18. The method of claim 16, wherein the additive manufacturing technique comprises binder jet three-dimensional printing.

19. The method of claim 15, wherein the layer of an adhesive defines a layer thickness of less than about 0.2 millimeters.

* * * * *